United States Patent [19]

Fazekas

[11] Patent Number: 5,635,700
[45] Date of Patent: Jun. 3, 1997

[54] BAR CODE SCANNER WITH MULTI-CHANNEL LIGHT COLLECTION

[75] Inventor: Peter Fazekas, Medford, N.Y.

[73] Assignee: Symbol Technologies, Inc., Holtsville, N.Y.

[21] Appl. No.: 281,413

[22] Filed: Jul. 27, 1994

[51] Int. Cl.[6] .................................................. G06K 7/10
[52] U.S. Cl. ...................... 235/472; 235/462; 250/208.2; 250/208.6
[58] Field of Search ................................. 235/462, 472, 235/463; 250/208.2, 208.6; 327/352, 514

[56] References Cited

U.S. PATENT DOCUMENTS

| | | | |
|---|---|---|---|
| 3,716,699 | 2/1973 | Eckert, Jr. et al. | 235/463 |
| 4,013,893 | 3/1977 | Hertig | 250/568 |
| 4,387,297 | 6/1983 | Swartz et al. | 235/462 |
| 4,460,120 | 7/1984 | Sheperd et al. | 235/472 |
| 4,542,528 | 9/1985 | Sanner et al. | 235/462 X |
| 5,144,120 | 9/1992 | Krichever et al. | 235/462 |
| 5,184,004 | 2/1993 | Ueda et al. | 235/462 |
| 5,258,605 | 11/1993 | Metlitsky et al. | 235/462 |
| 5,272,353 | 12/1993 | Barkan et al. | 250/566 |
| 5,278,397 | 1/1994 | Barkan et al. | 235/462 |
| 5,308,966 | 3/1994 | Danielson et al. | 235/472 |

FOREIGN PATENT DOCUMENTS

| | | |
|---|---|---|
| 40 35 368 A1 | 5/1992 | Germany. |
| 112384 | 1/1989 | Japan. |
| 2-53191 | 2/1990 | Japan. |

OTHER PUBLICATIONS

Siemens, BPX 48, Differential Photodiode, 20–21. * month & year are missing.
Siemens, SFH 204, Silicon Four Quadrant Photodiode, 44–45. * month & year are missing.

*Primary Examiner*—Donald T. Hajec
*Assistant Examiner*—Michael G. Lee
*Attorney, Agent, or Firm*—Fish & Richardson P.C.

[57] ABSTRACT

Bar code reading in which light reflected from a scanned symbol is optically collected by a multi-channel light detector comprising an array of more than one individual light detection elements (e.g., photodetectors) each having an output capable of providing an output signal representative of light impinging thereon, amplifiers respectively coupled to each of the light detection elements, and a summing unit coupled to the outputs of each of the amplifiers for providing a signal representative of the sum of the amplified output signals of all of the light detection elements.

15 Claims, 3 Drawing Sheets

BAR CODE SCANNER WITH MULTI-CHANNEL LIGHT COLLECTION

BACKGROUND

This invention relates to bar code reading.

In bar code readers, a light beam is scanned across a bar code symbol, and reflected light is collected, using either retroreflective or non-retroreflective light collection, and decoded into electrical signals representative of the information stored on the bar code symbol.

In retroreflective readers, a moving optical component, e.g., a rotating mirror, as described, e.g., in Krichever et al. U.S. Pat. No. 4,816,661 or Shepard et al. U.S. Pat. No. 4,409,470, both herein incorporated by reference, scans the beam across a target surface and directs the collected light to a detector. The rotating mirror must be relatively large to receive the incoming light, but only a small detector is required because the rotating mirror can focus the light onto a small area. As a result, the detector has a relatively small field-of-view, which increases the signal-to-noise ratio of the reader.

In non-retroreflective bar code readers, the reflected laser light is not collected by the same rotating mirror used for scanning. Instead, the detector is constructed to have a large field-of-view so that the reflected laser light traces across the surface of the detector. Because the rotating mirror need only handle the outgoing light beam, it can be made much smaller. But the field-of-view of the detector must be relatively large in order to receive the incoming light beam from all scanned locations.

In recent years, it has become increasingly desirable to increase the scan rate of bar code readers (e.g., to increase the throughput of scanned items). There has also been a push toward smaller, hand-held bar code readers. While the performance of hand-held readers has reached acceptable levels, the ability to improve the performance of such reader has been somewhat elusive. As bar code readers become smaller, the optics used to collect light reflected from the bar code symbol generally become proportionally smaller, and thus, the levels of the collected signals are becoming smaller, as well. However, noise in the electronic components of the reader does not scale proportionally with the optical collection area. This reduces the signal-to-noise ratio of the readers, which reduces their performance. For example, lower signal-to-noise ratios reduce the working range of the reader and increases the reader's susceptibility to ambient light corruption.

SUMMARY OF THE INVENTION

In general, the invention features bar code reading in which light reflected from a scanned symbol is optically collected by a multi-channel light detector comprising an array of more than one individual light detection element (e.g., photodetector) each having an output capable of providing an output signal representative of light impinging thereon, amplifiers respectively coupled to each of the light detection elements, and a summing unit coupled to the outputs of each of the amplifiers for providing a signal representative of the sum of the amplified output signals of all of the light detection elements.

The invention resolves the seemingly conflicting requirements encountered in conventional bar code readers of small size, large working range, and high scan speeds.

By reducing the surface area of each photodiode, the electrical capacitance is also reduced. This allows for an increased frequency response that has less attenuation for high frequency signals, requiring less compensating gain that also amplifies noise. Photodiode capacitance acts as a multiplier of the voltage noise of the pre-amplifier. Reducing the capacitance can reduce the total electrical noise in the reader. Reducing the area of each photodiode reduces the amount of ambient light current applied to each pre-amplifier. This feature improves the signal-to-noise ratio of the reader and reduces the reader's susceptibility to ambient light corruption. When the outputs of the pre-amplifiers are summed, the signals add linearly, but noise adds statistically, which provides an overall improvement in the signal-to-noise ratio of the bar code reader.

The output signals of the detection elements may preferably be amplified by transimpedance amplification, or alternatively by equalizing amplification. The scanning and light collection may be performed by using a single moving optical element, or by using a stationary optical element. The detection elements preferably comprise individually accessible photodetectors. A filter is preferably used to selectively transmit to the optical detector primarily only light having a wavelength range corresponding to the wavelength range of the scanning light beam. Field-of-view limiting optics are preferably provided to restrict the field of view of individual detection elements. The detector is preferably adapted so that each of the light detection elements receives approximately equal amounts of the incoming light. Preferably, the number of light detection elements is less than 50, and more preferably less than 16. In certain preferred embodiments, two to four light detection elements are used.

Other features and advantages of the invention will be apparent from the following description and from the claims.

DESCRIPTION OF PREFERRED EMBODIMENTS

Figure 1:
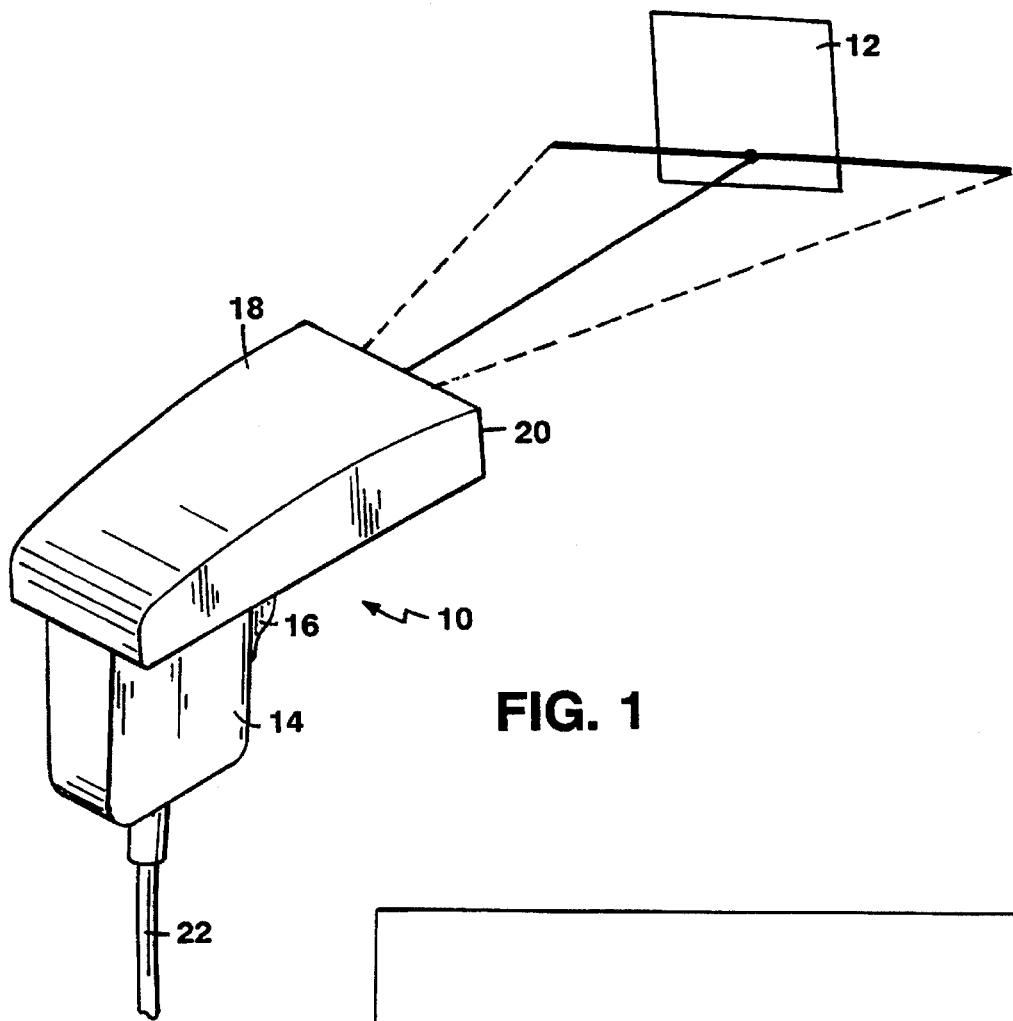
FIG. 1 is a perspective view of a hand-held bar code reader.

Referring to FIG. 1, a hand-held bar code reader 10 is positioned to read a two-dimensional bar code symbol 12. The reader is implemented as gun-shaped device with a pistol-grip handle 14. A manually-actuated trigger switch 16 allows an operator to activate the reader (typically, once the reader has been positioned to point at the symbol to be scanned). A lightweight plastic housing 18 contains the optical components of the reader, including a laser source and detector. A light-transmissive window 20, at the front-end of the reader, allows outgoing laser beams generated by the laser to exit the reader, and allows incoming beams, reflected from bar code symbol 12, to enter the reader. An electrical cable 22 carries signals from the reader 10 to a decode module (not shown) that decodes the reader signals into data representative of the scanned bar code symbol. An external host device (not shown), e.g., a programmable computer, serves as a data store in which data generated by decode module is stored for subsequent processing.

In use, each time a user wishes to read a bar code symbol, the user aims the bar code reader at the symbol and pulls trigger 16. The symbol is scanned at a rapid rate, e.g., on the order of four hundred to five hundred scans per second. As soon as the symbol has been successfully decoded and read, the scanning action is automatically terminated, enabling the user to direct the reader to another target to be read.

Figure 2:
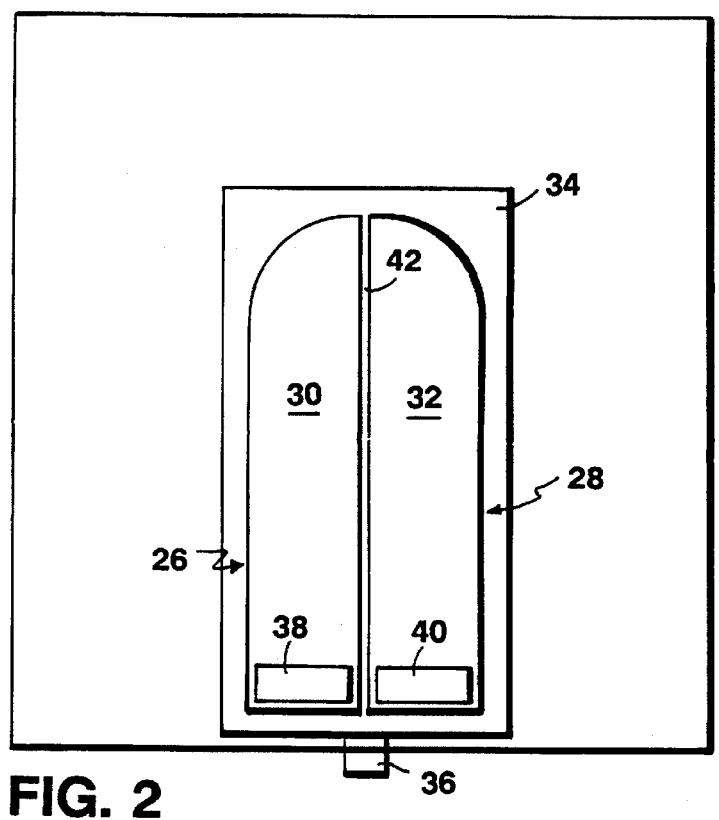
FIG. 2 is a diagrammatic top view of a multi-channel light detector.

Referring to FIG. 2, a multi-channel light detector includes an array of two individually accessible photodetectors 26, 28 (e.g., silicon p-i-n photodiodes), each having respective photosensitive (i.e., active) areas 30, 32, on a common silicon substrate 34. The photodiodes share a common cathode 36 and individual respective anodes 38, 40. The respective active areas of the photodiodes are separated by a trough 42 which is etched into the silicon substrate between the two active areas. The trough is on the order of about 0.05 mm wide. Each of the photodiodes is active while a symbol is being read so that all of the incoming light that impinges on the active regions of the photodiodes is detected.

Each of the photodiodes of the multi-channel detector preferably has the same specifications. In a preferred embodiment, each photodiode 26, 28 has a breakdown voltage of at least 35 volts, a maximum junction capacitance of 5 pF at a reverse bias of 1.5 volts, a responsivity (i.e., the ratio of photocurrent to optical power) between 0.45 and 0.55 A/W for radiation with a wavelength of 675 nm, and a dark current of 10 nA at a reverse bias of 10 volts. The values selected for these parameters are based upon the particular application for which the detector is used.

In a typical retroreflective reader, the array of photodetectors spans an image area on the order of about 1.5 mm by 2.5 mm, whereas for a non-retroreflective reader, the array typically would span an image area on the order of about 4 mm by 12 mm. It should be appreciated that the density of the photodiodes will depend upon, e.g., the specific dimensions of the optical components of the reader and the typical distances between the reader and the objects to be read. Generally, the performance of the reader will increase with the number of photodiodes in the multi-channel detector. However, the size and cost of the reader will also increase with the number of photodiodes. Typically, the number of photodiodes used in the multi-channel detector is selected by balancing the performance requirements with the desired size and cost of the reader. The number of individually accessible photodiodes used in the multi-channel detector is preferably less than fifty, more preferably less than sixteen. In certain preferred embodiments two to four photodiodes are used in the multi-channel detector.

The optical components of the reader and the multi-channel detector are preferably designed so that the signal energy received by the multi-channel detector is divided approximately equally among the photodiodes. Each photodiode generates an electrical analog signal indicative of the variable intensity of the reflected light. The analog signal is converted into a digital signal which is conducted along electrical cable 22 (FIG. 1) to a decode module, that decodes the output signal into data representative of the information stored on the scanned bar code symbol. The decode module preferably includes a digitizer circuit for shaping the converted signal, e.g., as described in Martino U.S. Pat. No. 5,272,323, which is herein incorporated by reference.

Figure 3:
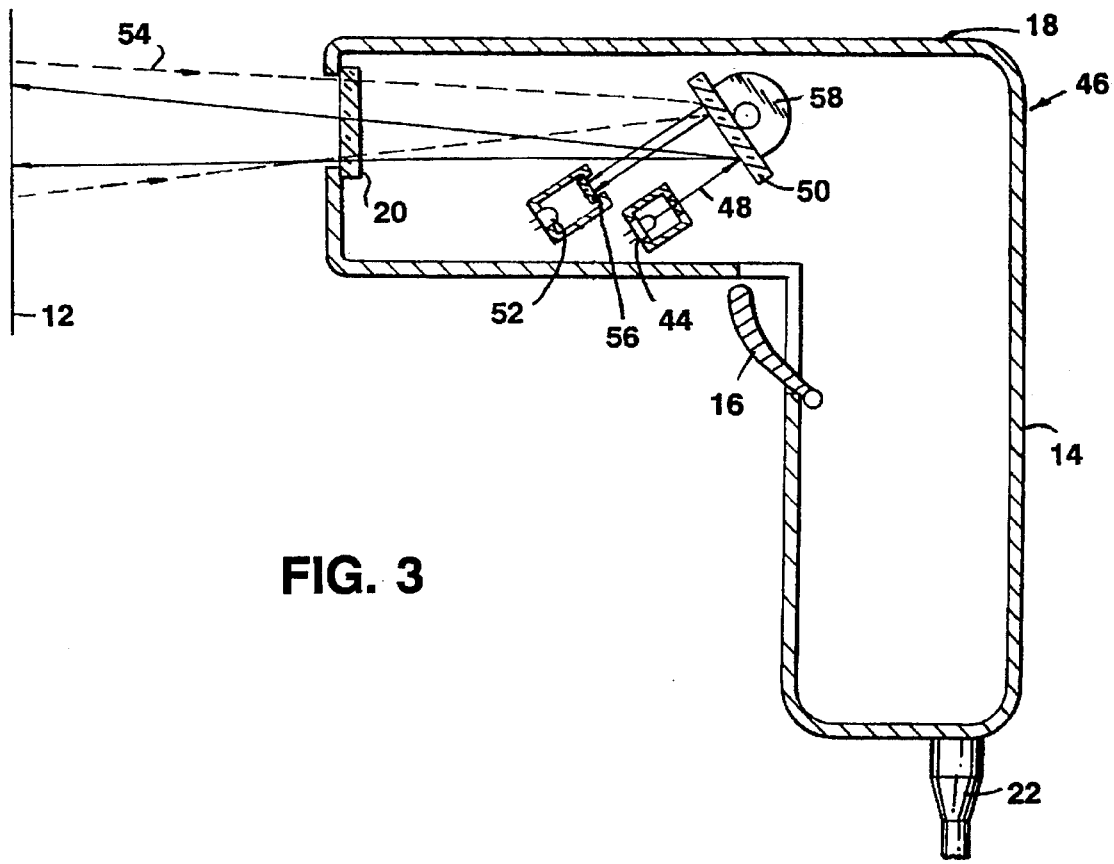
FIG. 3 is a sectional view of a retroreflective bar code reader.

Referring to FIG. 3, a laser diode 44, which is mounted inside a retroreflective bar code reader 46, emits a light beam along an outgoing path 48 to a mirror 50 which, in turn, reflects the light beam through window 20 and toward bar code symbol 12. A multi-channel photodetector 52 receives the light that reflects from symbol 12 along a return path 54. An aperture stop 56 is positioned in the beam path of the returning light to limit the field-of-view of multi-channel detector 52. Mirror 50 directs the outgoing light along a path which traces the beam across the surface of target 12. An electrically-operated drive 58 moves mirror 50 in alternating circumferential directions to produce back-and-forth scan traces across the target. In an alternative embodiment, the drive causes the mirror to rotate completely around an axis of rotation. Scan rates of up to about 500 Hz can be achieved. In yet another embodiment, the scanning optics may comprise an omni-directional scan line pattern generator that generates intersecting scan line patterns, as described in Krichever et al., U.S. Pat. No. 5,059,779, assigned to the present assignee, which is herein incorporated by reference.

Collection optics (not shown) may be positioned in the return beam path to increase the signal level of the light received from the bar code symbol. However, if no light collection optics are used, the retroreflective reader can be made smaller, which reduces the manufacturing costs of the reader, as described in Barkan et al., U.S. Pat. No. 5,272,353, assigned to the present assignee, which is herein incorporated by reference.

Figure 4:
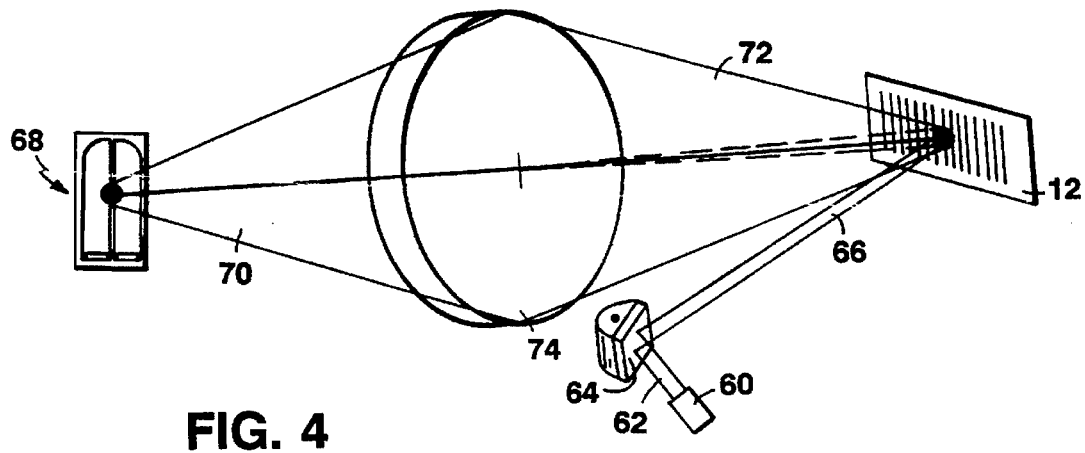
FIG. 4 is a schematic view of a non-retroreflective light collection scheme in which light reflecting from a bar code symbol is focused onto a portion of an array of two photodetectors.

Referring to FIG. 4, in a non-retroreflective bar code reader, a laser source 60, e.g., a semiconductor laser diode emits a light beam 62 toward a moving optical element 64 (e.g., a rotating mirror), which in turn directs the outgoing light beam along an outgoing path 66 toward bar code symbol 12. A multi-channel detector 68 receives an incoming light beam 70, which reflects off symbol 12 and enters the reader along a return beam path 72 and traces across the active areas of multi-channel detector 68. An optical lens 74 and an optical filter (not shown) can be mounted inside the reader to intercept the incoming light before the incoming light reaches detector 68. If a filter is used, the filter preferably only transmits light that has a wavelength range corresponding to the wavelength range of the scanned laser beam.

The particular amplification scheme selected for retroreflective and non-retroreflective bar code readers depends upon, among other considerations, the dimensions of the reader and the requirements of the application for which the readers are to be used.

Figure 5:
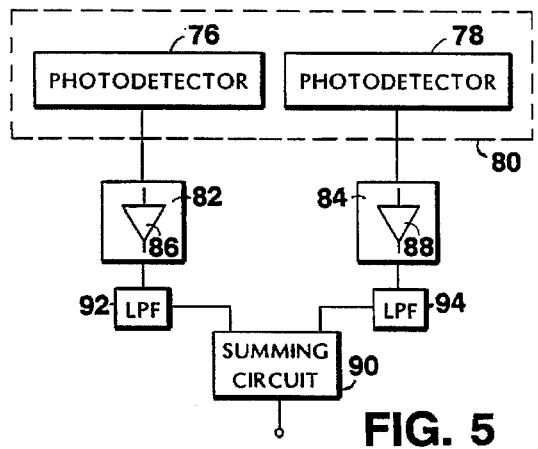
FIG. 5 is a schematic block diagram of a photodetector array and associated circuitry in a transimpedance amplification scheme.

Referring to FIG. 5, in a transimpedance mode of amplification, the signals generated by each of the photodiodes 76, 78 of a multi-channel detector 80 are amplified by respective transimpedance amplifiers 82, 84 which include respective operational amplifiers 86, 88. The operational amplifiers isolate the capacitances of the photodiodes from the rest of the reader circuitry, thereby increasing the bandwidth of the reader.

The noise level in bar code readers using transimpedance amplification increases with the size of the photodiode capacitance because the noise gain of the preamplifier to its internal voltage noise is proportional to the size of the photodiode capacitance and the signal-to-noise ratio decreases as the photodiode capacitance increases. Thus, for a given field-of-view, dividing the field-of-view between an array of more than one photodiode reduces the size required for each photodiode which reduces the capacitance coupled to each transimpedance amplifier and reduces the noise level of the multi-channel detector relative to a single-channel detector having the same field-of-view.

The output of each transimpedance amplifier 82, 84 couples to the input of a summing circuit 90, which provides an output signal representative of the algebraic sum of the output values of all of the photodiodes. Low-pass filters 92, 94 may be employed at the output of each transimpedance amplifier 82, 84, to attenuate high frequency noise signals.

For a given field-of-view, each photodiode of the two-channel detector 80 generates about half the signal level and about half the noise level that would be generated by a single-channel detector. Therefore, the total signal level produced at the output 96 of the summing unit is approximately equal to the signal level of the single-channel detector. However, since noise adds statistically, the total noise level will be about 70% ($1/\sqrt{2}$) of the noise level of the single-channel detector. Therefore the overall single-to-noise ratio of the two-diode multi-channel detector is about 1.4 ($\sqrt{2}$) times greater than that of the single-channel detector.

In addition, for a given saturation limit of the transimpedance amplifier, use of the multi-channel detector allows a larger feedback resistor to be used, because there is less ambient light received by each photodiode in the multi-channel detector relative to a single-channel detector, which increases the base signal level of the detector. Although, thermal noise is proportional to the square root of the resistance, the signal level is proportional to the resistance. Therefore, the use of a larger feedback resistor improves the signal-to-noise ratio of the reader.

Figure 6:
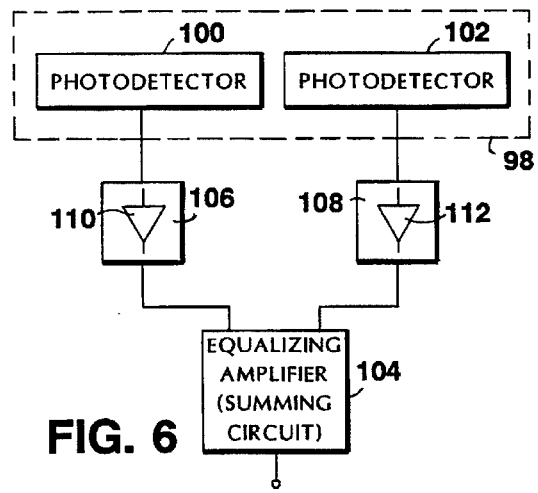
FIG. 6 is a schematic block diagram of a photodetector array and associated circuitry in an equalizing amplification scheme.

Referring to FIG. 6, in an equalizing mode of amplification, a multi-channel detector 98 includes two individually accessible photodiodes 100, 102, which are coupled to an equalizing amplifier 104 (which serves as a summing circuit) through respective preamplifiers 106, 108, each of which includes a preamplifier 110, 112. The preamplifiers tend to reduce the bandwidth of the reader, as a result of the low pass filters created by the large front end resistor (e.g., resistor 114 shown in FIG. 6A, below) of the preamplifier and the capacitance of the photodiodes. The equalizing amplifier is generally used to offset the bandwidth-limiting effects of the front-end low-pass filters and thereby increase the bandwidth of the reader.

Figure 6A:
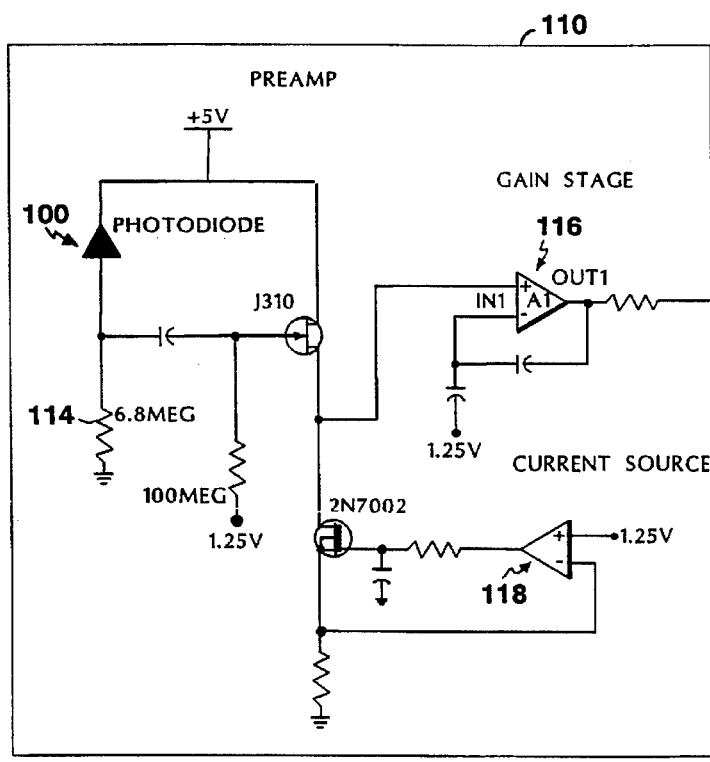
FIG. 6A is a schematic diagram of circuitry associated with the equalizing amplification scheme shown in FIG. 6.
Figure 6A:
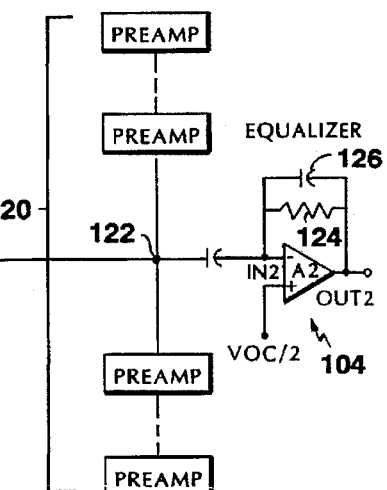

Referring to FIG. 6A, a preamplifier 110 includes a high value resistor 114, which is coupled between the output of photodiode 100 and ground, a gain stage 116, and a current source 118. A number of similar preamplifiers 120, equal to the number of photodiodes in multi-channel detector 98, are coupled in parallel to node 122, as shown. Equalizing amplifier 104 includes a resistor 124 and a capacitor 126 coupled in parallel across the inverting feedback loop of an operational amplifier 128.

Relative to a single-channel detector, use of a multi-channel detector in a bar code reader using equalizing amplification provides a number of advantages. Since each channel has a smaller input capacitance, each channel has a higher bandwidth, and thus the overall bandwidth of the reader is increased. Because less ambient light is received on each photodiode, relative to the total ambient light received by a single-channel detector, a larger resistive converter can be used, which increases the signal-to-noise ratio of the reader. Because each photodiode of the multi-channel detector has a smaller capacitance relative to a single-channel detector, less compensation gain is required in the equalizing amplifier. Therefore, since the gain of the equalizing amplifier amplifies the signal level and the noise level by an equal amount, the signal-to-noise ratio is increased when less compensating gain is required. The signal-to-noise ratio is also improved for reasons analogous to those discussed above in connection with the fact that noise adds statistically and signals add algebraically.

Because the overall active area of the multi-channel detector is significantly greater in non-retroreflective bar code readers, relative to retroreflective readers, the amount of ambient light received by a non-retroreflective reader is also much greater. Therefore, transimpedance amplification is typically used in non-retroreflective readers to avoid saturation problems that would likely arise if equalizing amplification were used. Equalizing preamplification, on the other hand, is generally preferred for retroreflective readers that have low ambient light levels because of the advantages that can be gained by using a large resistor coupled to the photodiodes. Transimpedance amplification is generally used in non-retroreflective readers because it is often easier to implement and because of the relatively high ambient light levels associated with non-retroreflective readers, there is relatively little advantage to be gained by using an equalizing amplification scheme.

Other embodiments are within the scope of the following claims. For example, the invention may be used with a wide variety of bar code readers, e.g., wand-type readers and fixed mount readers in which no trigger is used to initiate reading. A fixed mount reader may scan continuously or be controlled by an external signal to initiate reading.

What is claimed is:

1. An optical reader for scanning an outgoing light beam across an information symbol comprising regions of different light reflectivity, and for collecting an incoming light beam reflecting from the symbol, the reader comprising:

a source of the outgoing light beam;

scanning optics with at least one moving optical element for tracing the outgoing light beam across the symbol;

light collection optics for collecting the incoming light beam and for directing the incoming light beam to a multi-channel light detector;

the multi-channel light detector comprising an array of more than one individual light detection elements, each having an output capable of providing an output signal representative of light impinging thereon;

the output of each detection element being coupled to a respective amplifier for amplifying the output signal of a respective detection element; and a summing circuit having an input coupled to the amplifiers for providing a signal representative of the sum of the amplified output signals of all of the light detection elements.

2. A method of optically scanning an outgoing light beam across an information symbol comprising regions of different light reflectivity, and collecting an incoming light beam reflecting from the symbol, the method comprising the steps of:

generating the outgoing light beam;

scanning the outgoing light beam across the symbol using at least one moving optical element;

collecting the incoming light beam using light collection optics and directing the incoming light beam to multi-channel light detector, the multi-channel light detector comprising an array of individual light detection elements, each capable of providing an output signal representative of light impinging thereon;

individually amplifying the output signal of each light detection element; and summing the amplified output signals of all of the light detection elements.

3. Apparatus for optically scanning an outgoing light beam across an information symbol comprising regions of different light reflectivity, and collecting an incoming light beam reflecting from the symbol, comprising:

light source means for generating the outgoing light beam;

scanning means for scanning the outgoing light beam across the symbol using at least one moving optical element;

collecting means for collecting the incoming light beam using light collection optics and directing the incoming light beam to a multi-channel light detector;

the multi-channel light detector comprising an array of individual light detection elements, each capable of providing an output signal representative of light impinging thereon;

amplifying means for individually amplifying the output signals of each of the detection elements; and summing means coupled to the amplifiers for providing a signal representative of the sum of the amplified output signals of all of the light detection elements.

4. The subject matter of claim 1, 2, or 3 wherein amplifying the output signals of the detection elements is performed by transimpedance amplification.

5. The subject matter of claim 4 wherein the detection elements comprise individually accessible photodetectors.

6. The subject matter of claim 1, 2, or 3 wherein amplifying the output signals of the detection elements is performed by equalizing amplification.

7. The subject matter of claim 6 wherein the detection elements comprise individually accessible photodetectors.

8. The subject matter of claim 1, 2, or 3 wherein scanning and light collection are performed by using a single moving optical element.

9. The subject matter of claim 8 wherein the detection elements comprise individually accessible photodetectors.

10. The subject matter of claim 1, 2, or 3 wherein light collection is performed by using a stationary optical element.

11. The subject matter of claim 10 wherein the detection elements comprise individually accessible photodetectors.

12. The subject matter of claim 1, 2, or 3 wherein field-of-view limiting optics are provided to restrict the field of view of individual detection elements.

13. The subject matter of claim 1, 2, or 3 wherein the detector is adapted so that each of the detection elements receives approximately equal amounts of the incoming light.

14. The subject matter of claim 1, 2, or 3 wherein the number of light detection elements is less than 50.

15. The subject matter of claim 1, 2, or 3 wherein the number of light detection elements is less than 16.

* * * * *